（12）United States Patent
Li et al.

(10) Patent No.: US 10,536,971 B2
(45) Date of Patent: Jan. 14, 2020

(54) DATA TRANSMISSION METHOD AND ELECTRONIC DEVICE, AND DEVICE HAVING BASE STATION FUNCTION

(71) Applicant: NANCHANG COOLPAD INTELLIGENT TECHNOLOGY COMPANY LIMITED, Nanchang (CN)

(72) Inventors: Mingju Li, Guangdong (CN); Yajun Zhu, Guangdong (CN); Yunfei Zhang, Guangdong (CN)

(73) Assignee: NANCHANG COOLPAD INTELLIGENT TECHNOLOGY COMPANY LIMITED, Nanchang, Jiangxi Province (CN)

( * ) Notice: Subject to any disclaimer, the term of this patent is extended or adjusted under 35 U.S.C. 154(b) by 0 days.

(21) Appl. No.: 15/468,935

(22) Filed: Mar. 24, 2017

(65) Prior Publication Data

US 2017/0251494 A1   Aug. 31, 2017

Related U.S. Application Data

(63) Continuation-in-part of application No. PCT/CN2014/087618, filed on Sep. 26, 2014.

(51) Int. Cl.
*H04W 74/00* (2009.01)
*H04W 76/15* (2018.01)
(Continued)

(52) U.S. Cl.
CPC ............ *H04W 74/006* (2013.01); *H04L 5/14* (2013.01); *H04W 74/0816* (2013.01); *H04W 76/15* (2018.02); *H04W 84/042* (2013.01)

(58) Field of Classification Search
CPC ........... H04W 74/006; H04W 72/1215; H04W 74/0816; H04W 76/15; H04W 16/14; H04W 84/042; H04L 5/14
See application file for complete search history.

(56) References Cited

U.S. PATENT DOCUMENTS

2008/0062914 A1*  3/2008  Olfat ............... H04L 5/0007
                                                    370/321
2015/0365152 A1* 12/2015  Frenne ............ H04B 7/0626
                                                    370/252
(Continued)

FOREIGN PATENT DOCUMENTS

CN        103404070       11/2013
CN        103650622        3/2014
(Continued)

OTHER PUBLICATIONS

Written Opinion and International Seach Report issued by the International Searching Authority in International Application No. PCT/CN2014/087618 dated Jun. 15, 2015.
(Continued)

*Primary Examiner* — Andrew Lai
*Assistant Examiner* — Harry H Kim
(74) *Attorney, Agent, or Firm* — Troutman Sanders LLP

(57) ABSTRACT

A data transmission method, an electronic device and a device having a base station function, wherein, a channel sensing sub-frame is arranged in a frame structure used only for downlink transmission frequency division duplexing; within any period, downlink data is sent via a downlink sub-frame in the frame structure when the channel sensing sub-frame senses that the downlink channel is in an idle state, or otherwise downlink data is not sent. Therefore, on the premise that normal operation of the LTE system by means of the supplemental downlink mode in the unlicensed frequency band can be ensured, the LTE system is prevented
(Continued)

from generating significant interference with regard to other systems when operating in the unlicensed frequency band.

18 Claims, 6 Drawing Sheets

(51) Int. Cl.
*H04L 5/14* (2006.01)
*H04W 74/08* (2009.01)
*H04W 84/04* (2009.01)

(56) References Cited

U.S. PATENT DOCUMENTS

2016/0007368 A1* 1/2016 Moon .................. H04W 56/00
  370/329
2017/0094681 A1* 3/2017 Takeda ................. H04W 16/14

FOREIGN PATENT DOCUMENTS

WO 2012/139278 A1 10/2012
WO 2014/023458 2/2014
WO 2014/083419 A2 6/2014

OTHER PUBLICATIONS

Qualcomm Technologies, Inc., "Qualcomm Research LTE in Unlicensed Spectrum: Harmonious Coexistence with Wi-Fi," Jun. 30, 2014, 19 pages total.

European Search Report dated Apr. 18, 2018, issued in connection with European Application No. EP14902604.9.

* cited by examiner

DATA TRANSMISSION METHOD AND ELECTRONIC DEVICE, AND DEVICE HAVING BASE STATION FUNCTION

CROSS REFERENCE

This application is a continuation-in-part of International Application No. PCT/CN2014/087618 Sep. 26, 2014, the entire contents of which are incorporated herein by reference.

TECHNICAL FIELD

The present disclosure relates to the field of communication technology, and particularly to a data transmission method for when an LTE system operates using a supplemental downlink mode in an unlicensed frequency band, an electronic device for when an LTE system operates using a supplemental downlink mode in an unlicensed frequency band and a device having a base station function.

BACKGROUND

With the sharp increase of communication traffic volume, licensed frequency spectrum of 3GPP is increasingly not enough to provide higher network capacity. In order to further improve the utilization of spectrum resources, 3GPP is discussing how to use an unlicensed frequency spectrum with the help of a licensed frequency spectrum, such as frequency bands of 2.4 GHz and 5 GHz. At present, the unlicensed frequency spectrums being used mainly include Wi-Fi, Bluetooth, radar, medical systems, and the like.

Under normal circumstances, the access technologies designed for licensed frequency bands, such as LTE (Long Term Evolution), are not suitable for use in unlicensed frequency bands, because the access technologies, such as LTE, have very high requirements of the spectral efficiency and user experience optimization. However, the carrier aggregation (CA) function provides a possibility for deployment of the LTE in an unlicensed frequency band. 3GPP proposes a concept of LAA (LTE Assisted Access) to use an unlicensed frequency spectrum with the help of an LTE licensed frequency spectrum. An unlicensed frequency spectrum may have two operation modes, one is supplemental downlink (SDL), that is, there are only downlink transmission sub-frames; and the other is a TDD (Time Division Duplexing) mode, including not only downlink sub-frames, but also uplink sub-frames. The case of SDL can only be used with the help of the carrier aggregation technology. However, the TDD mode can not only be used with the help of the carrier aggregation technology, but also be used with the help of the DC (Dual Connectivity), and can also be used independently.

Compared to a Wi-Fi system, an LTE system operating in an unlicensed frequency band is capable of providing a higher spectral efficiency and a greater coverage effect, whilst allowing seamless switching of data traffic between a licensed frequency band and an unlicensed frequency band based on a same core network. For users, this means a better broadband experience, a higher rate, a better stability and a mobile convenience.

The existing access technology used in an unlicensed frequency spectrum, such as Wi-Fi, has a weak anti-interference ability. To avoid interference, the Wi-Fi system designs a lot of interference avoidance regulations, such as CSMA/CD (Carrier Sense Multiple Access/Collision Detection). The basic principle of this method is that before an AP (access point) or a terminal of the Wi-Fi sends a signaling or data, it is necessary to first sensor whether other APs or other terminals around are sending/receiving signalings or data, and, if other APs or other terminals around are sending/receiving signalings or data, continue sensing, until no signaling or data transmission is sensed; or otherwise, generate a random number as a backoff time, within which, if no signaling or data transmission is detected, then on completion of the backoff time, the AP or the terminal may start to send a signaling or data. This process is shown in FIG. 1.

However, an LTE network ensures an interference level because of its very good orthogonality, so the uplink and downlink transmission between a base station and a user does not need to consider whether other base stations or other users around are transmitting data. If LTE is used in an unlicensed frequency band without considering whether other devices around are using the unlicensed band, then it will bring a great interference to a Wi-Fi device. As long as there is traffic, LTE transmits traffic without any sensing rule, so that the Wi-Fi device cannot transmit traffic when the LTE is transmitting traffic. Only until the LTE completes traffic transmission, is it possible to detect an idle state of a channel for data transmission.

It is thus clear that when an LTE network uses an unlicensed frequency band, one of the most important key points is to ensure that LAA is capable of coexisting with an existing access technology (such as Wi-Fi) on a fair and friendly basis. The conventional LTE system does not have a LBT (Listen Before Talk) mechanism to avoid collision.

Therefore, on the premise that normal operation of an LTE system in an unlicensed frequency band can be ensured, how to prevent the LTE system from generating significant interference with regard to other systems when operating in the unlicensed frequency band becomes a technical problem in urgent need of solution.

SUMMARY

Based on at least one of the above technical problems, the present disclosure proposes a new data transmission solution for when an LTE system operates using a supplemental downlink mode in an unlicensed frequency band, which is applicable to a device having a base station function, and can, on the premise that normal operation of the LTE system by means of the supplemental downlink mode in the unlicensed frequency band can be ensured, prevent the LTE system from generating significant interference with regard to other systems when operating in the unlicensed frequency band, thereby implementing peaceful coexistence of the LTE system and the other systems in the unlicensed frequency band.

In view of this, the present disclosure proposes a data transmission method for when an LTE system function operates using a supplemental downlink mode in an unlicensed frequency band, applicable to a device having a base station, and including: arranging a channel sensing sub-frame used for periodically sensing a downlink channel state in a frame structure used only for downlink transmission frequency division duplexing; and within any period, if the channel sensing sub-frame senses that the downlink channel is in an idle state, sending downlink data via a downlink sub-frame located within the any period in the frame structure, or otherwise, failing to send downlink data within the any period.

In the technical solution, by arranging a channel sensing sub-frame used for sensing a downlink channel state in a frame structure used only for downlink transmission frequency division duplexing, so as to send downlink data via a downlink sub-frame in the above frame structure when the channel sensing sub-frame senses that the downlink channel is in an idle state, or fail to send downlink data when the channel sensing sub-frame senses that the downlink channel is in a busy state, the LTE system can adopt a corresponding interference avoidance mechanism when operating using a supplemental downlink mode in an unlicensed frequency band, and then can peacefully coexist with other systems (e.g. a Wi-Fi system) operating in the unlicensed frequency band when operating in the unlicensed frequency band, so as to, on the premise that normal operation of the LTE system in the unlicensed frequency band can be ensured, prevent the LTE system from generating significant interference with regard to other systems having a interference avoidance mechanism when operating in the unlicensed frequency band because of no interference avoidance mechanism. The data therein includes not only general interactive data, but also control signalings, etc. The device having a base station function includes a base station, a microcell base station implemented through a communication device (e.g. a smartphone or the like), and the like.

In the above technical solution, preferably, the channel sensing sub-frame is arranged within at least one of downlink sub-frames of the frame structure.

In the technical solution, by arranging the channel sensing sub-frame within at least one of downlink sub-frames of the frame structure used only for downlink transmission frequency division duplexing, it is not necessary to additionally arrange other sub-frames to bear the channel sensing sub-frame in the frame structure for frequency division duplexing; furthermore, the channel sensing sub-frame can be arranged within one or a plurality of downlink sub-frames of the frame structure for frequency division duplexing according to the practical situation of the LTE system.

In the above technical solution, preferably, a guard period occupying a predetermined length of time is arranged in each downlink sub-frame of the at least one downlink sub-frames. The channel sensing sub-frame is arranged behind a symbol occupied by the guard period, and occupies a predetermined number of symbols.

In the technical solution, because in the frame structure, it is necessary to set a guard period when the downlink sub-frame is converted to an uplink sub-frame, and the channel sensing sub-frame needs to monitor an uplink signal to detect a channel state, when the channel sensing sub-frame is arranged in the frame structure used only for downlink transmission frequency division duplexing, it is necessary to set a guard period to achieve conversion from downlink to uplink.

In the above technical solution, preferably, the predetermined length of time is greater than 0 and is less than or equal to a length of time occupied by 10 symbols, the predetermined number is from 1 to 13, and the sum of the predetermined length of time and the length of time occupied by the channel sensing sub-frame is less than or equal to 1 ms.

In the technical solution, one sub-frame contains 14 symbols, the length of time occupied by the guard period is greater than 0 and is less than a length of time occupied by 10 symbols, and the number of symbols occupied by the channel sensing sub-frame must be an integer. Therefore, the length of time occupied by the guard period is greater than 0 and is less than or equal to a length of time occupied by 10 symbols, and the number of symbols occupied by the channel sensing sub-frame is from 1 to 13.

In the above technical solution, preferably, the symbols occupied by the guard period and the symbols occupied by the channel sensing sub-frame are located at the front-end or back-end of each of the downlink sub-frames, and other symbols within each of the downlink sub-frames are used for transmitting downlink data.

In the above technical solution, preferably, if the channel sensing sub-frame senses in each occupied symbol that the downlink channel is in an idle state, then the downlink channel is determined to be in an idle state, or otherwise, the downlink channel is determined to be in a busy state.

In the technical solution, the channel sensing sub-frame senses 1 symbol once. Therefore, when the channel sensing sub-frame senses in each occupied symbol that a downlink channel is in an idle state, then the downlink channel is determined to be in an idle state.

The number of symbols occupied by the channel sensing sub-frame is set as follows:

Preferably, the above technical solution further includes: in the operation process of the LTE system, the number of symbols occupied by the channel sensing sub-frame is a fixed value; or In the operation process of the LTE system, a change rate of channel conditions of other systems using the unlicensed frequency band around the LTE system is detected in real time, and the number of symbols occupied by the channel sensing sub-frame is dynamically set according to the change rate of channel conditions of the other systems detected in real time and/or the channel detectability of the device having a base station function.

Specifically, the change rate of channel conditions of the other systems is directly proportional to the number of symbols occupied by the channel sensing sub-frame; and the channel detectability of the device having a base station function is inversely proportional to the number of symbols occupied by the channel sensing sub-frame.

In the technical solution, the number of symbols occupied by the channel sensing sub-frame can be a fixed value or can be adjusted according to the actual situation in the operation process of the LTE. When the number of symbols occupied by the channel sensing sub-frame is adjusted according to the actual situation, in order to accurately measure the state of a downlink channel, if a change rate of channel conditions of other systems using an unlicensed frequency band around an LTE system is fast, then it is necessary to measure the state of a downlink channel many times, namely, a high number of symbols occupied by the channel sensing sub-frame is set; and if the channel detectability of an LTE system is poor, it is also necessary to measure the state of a downlink channel many times, namely, a high number of symbols occupied by the channel sensing sub-frame is set. Therefore, the change rate of channel conditions of the other systems is directly proportional to the number of symbols occupied by the channel sensing sub-frame, and the channel detectability of the device having a base station function is inversely proportional to the number of symbols occupied by the channel sensing sub-frame.

A period of the channel sensing sub-frame is set as follows:

Preferably, the above technical solution further includes: in the operation process of the LTE system, a change rate of a load state of the LTE system and a change rate of a load state of other systems using the unlicensed frequency band around the LTE system are detected in real time, and the period of the channel sensing sub-frame is dynamically set according to the change rate of the load state of the LTE system and/or the change rate of the load state of the other systems detected in real time.

Specifically, the change rate of the load state of the LTE system is inversely proportional to the period of the sensing sub-frame; and the change rate of the load state of the other systems is inversely proportional to the period of the sensing sub-frame.

In the technical solution, by dynamically setting the period of the channel sensing sub-frame according to the change rate of the load state of the LTE system and/or the change rate of the load state of the other systems detected in real time, the period of the channel sensing sub-frame can better comply with the operation state of the LTE system. Specifically, the higher the change rate of the load state of the LTE system is, the more greatly the transmission quantity of the downlink data is changed; and the higher the change rate of the load state of the other systems is, the more greatly the channel state is changed. Therefore, in order to transmit downlink data, it is necessary to measure the channel state at a short time interval, i.e. it is necessary to set a short period of the channel sensing sub-frame.

In the above technical solution, preferably, the period of the sensing sub-frame is: N×10 ms or M×1 ms, where N is a positive integer, and M is a positive integer from 1 to 9.

Preferably, the above technical solution further includes: judging whether it is necessary to process downlink traffic or not, and if it is necessary to process downlink traffic, then periodically sensing the state of the downlink channel via the channel sensing sub-frame of the frame structure.

In the technical solution, specifically, the base station can sense the state of the downlink channel via the channel sensing sub-frame only when determining that there is downlink traffic, and can, of course, do the same all along regardless of whether there is downlink traffic or not.

Preferably, the above technical solution further includes: judging whether the device having a base station function and other devices having a base station function belong to a same operator; and if determining that the device and the other devices belong to a same operator, setting the channel sensing sub-frame at a same position in the frame structure of the device having a base station function on a same carrier frequency as the position of the channel sensing sub-frame configured by the other devices in the frame structure of the other devices; or if determining that the device and the other devices belong to different operators, setting the channel sensing sub-frame at a different position in the frame structure of the device having a base station function on a same carrier frequency from the position of the channel sensing sub-frame configured by the other devices in the frame structure of the other devices.

In the technical solution, because channel detection aims to detect whether a base station of another operator, which may also be a device having a base station function, (To facilitate description, a base station is taken as an example hereinafter, but those skilled in the art should understand that the base station in this application may also be another device having a base station function) uses LAA, and whether Wi-Fi occupies channels, for a base station of a same operator, by configuring channel sensing sub-frames at a same position in a frame structure on a same carrier frequency, it is possible to avoid determining that a channel is busy because base stations belonging to a same operator detect signals of each other; and for base stations of different operators, it is necessary to set channel sensing sub-frames at different positions in a frame structure, so as to detect whether base stations of different operators occupy channels.

According to a second aspect, the present disclosure further proposes an electronic device for when an LTE system operates using a supplemental downlink mode in an unlicensed frequency band, applicable to a device having a base station function, and including: a first arranging unit, for arranging a channel sensing sub-frame used for periodically sensing a downlink channel state in a frame structure used only for downlink transmission frequency division duplexing; and a first processing unit, for, within any period, if the channel sensing sub-frame senses that the downlink channel is in an idle state, sending downlink data via a downlink sub-frame located within the any period in the frame structure, or otherwise, failing to send downlink data within the any period.

In the technical solution, by arranging a channel sensing sub-frame used for sensing a downlink channel state in a frame structure used only for downlink transmission frequency division duplexing, so as to send downlink data via a downlink sub-frame in the above frame structure when the channel sensing sub-frame senses that the downlink channel is in an idle state, or fail to send downlink data when the channel sensing sub-frame senses that the downlink channel is in a busy state, the LTE system can adopt a corresponding interference avoidance mechanism when operating using a supplemental downlink mode in an unlicensed frequency band, and then can peacefully coexist with the other systems (e.g. a Wi-Fi system) operating in the unlicensed frequency band when operating in the unlicensed frequency band, so as to, on the premise that normal operation of the LTE system by means of the supplemental downlink mode in the unlicensed frequency band can be ensured, prevent the LTE system from generating significant interference with regard to other systems having a interference avoidance mechanism when operating in the unlicensed frequency band because of no interference avoidance mechanism. The data therein includes not only general interactive data, but also control signalings, etc. The device having a base station function includes a base station, a microcell base station implemented through a communication device (e.g. a smartphone or the like), and the like.

In the above technical solution, preferably, the first arranging unit is specifically used for arranging the channel sensing sub-frame within at least one of downlink sub-frames of the frame structure.

In the technical solution, by arranging the channel sensing sub-frame within at least one of downlink sub-frames of the frame structure used only for downlink transmission frequency division duplexing, it is not necessary to additionally arrange other sub-frames to bear the channel sensing sub-frame in the frame structure for frequency division duplexing; furthermore, the channel sensing sub-frame can be arranged within one or a plurality of downlink sub-frames of the frame structure for frequency division duplexing according to the practical situation of the LTE system.

In the above technical solution, preferably, the first arranging unit is further used for arranging a guard period occupying a predetermined length of time in each downlink sub-frame of the at least one of the downlink sub-frames, wherein the channel sensing sub-frame is arranged behind a symbol occupied by the guard period, and occupies a predetermined number of symbols.

In the technical solution, because in the frame structure, it is necessary to set a guard period when a downlink sub-frame is converted to an uplink sub-frame, and the channel sensing sub-frame needs to monitor an uplink signal to detect a channel state, when the channel sensing sub-frame is arranged in the frame structure used only for downlink transmission frequency division duplexing, it is necessary to set a guard period to achieve conversion from downlink to uplink.

In the above technical solution, preferably, the predetermined length of time is greater than 0 and is less than or equal to a length of time occupied by 10 symbols, the predetermined number is from 1 to 13, and the sum of the predetermined length of time and the length of time occupied by the channel sensing sub-frame is less than or equal to 1 ms.

In the technical solution, one sub-frame contains 14 symbols, the length of time occupied by the guard period is greater than 0 and is less than a length of time occupied by 10 symbols, and the number of symbols occupied by the channel sensing sub-frame must be an integer. Therefore, the length of time occupied by the guard period is greater than 0 and is less than or equal to a length of time occupied by 10 symbols, and the number of symbols occupied by the channel sensing sub-frame is from 1 to 13.

In the above technical solution, preferably, the symbols occupied by the guard period and the symbols occupied by the channel sensing sub-frame are located at the front-end or back-end of each of the downlink sub-frames, and other symbols within each of the downlink sub-frames are used for transmitting downlink data.

In the above technical solution, preferably, the first processing unit includes a determining unit, for, when the channel sensing sub-frame senses in each occupied symbol that the downlink channel is in an idle state, determining that the downlink channel is in an idle state, or otherwise, determining that the downlink channel is in a busy state.

In the technical solution, the channel sensing sub-frame senses 1 symbol once. Therefore, when the channel sensing sub-frame senses in each occupied symbol that a downlink channel is in an idle state, then the downlink channel is determined to be in an idle state.

The number of symbols occupied by the channel sensing sub-frame is set as follows:

Preferably, the above technical solution further includes: a second arranging unit, for, in the operation process of the LTE system, arranging the number of symbols occupied by the channel sensing sub-frame as a fixed value; or a first detecting unit, for, in the operation process of the LTE system, detecting a change rate of channel conditions of other systems using the unlicensed frequency band around the LTE system in real time; and a third arranging unit, for dynamically setting the number of symbols occupied by the channel sensing sub-frame according to the change rate of channel conditions of the other systems detected by the first detecting unit in real time and/or the channel detectability of the device having a base station function.

Specifically, the change rate of channel conditions of the other systems is directly proportional to the number of symbols occupied by the channel sensing sub-frame; and the channel detectability of the device having a base station function is inversely proportional to the number of symbols occupied by the channel sensing sub-frame.

In the technical solution, the number of symbols occupied by the channel sensing sub-frame can be a fixed value or can be adjusted according to the actual situation in the operation process of the LTE. When the number of symbols occupied by the channel sensing sub-frame is adjusted according to the actual situation, in order to accurately measure the state of a downlink channel, if a change rate of channel conditions of other systems using an unlicensed frequency band around an LTE system is fast, then it is necessary to measure the state of a downlink channel many times, namely, a high number of symbols occupied by the channel sensing sub-frame is set; and if the channel detectability of an LTE system is poor, it is also necessary to measure the state of a downlink channel many times, namely, a high number of symbols occupied by the channel sensing sub-frame is set. Therefore, the change rate of channel conditions of the other systems is directly proportional to the number of symbols occupied by the channel sensing sub-frame, and the channel detectability of the device having a base station function is inversely proportional to the number of symbols occupied by the channel sensing sub-frame.

A period of the channel sensing sub-frame is set as follows:

Preferably, the above technical solution further includes: a second detecting unit, for, in the operation process of the LTE system, detecting a change rate of a load state of the LTE system and a change rate of a load state of other systems using the unlicensed frequency band around the LTE system in real time; and a fourth arranging unit, for dynamically setting the period of the channel sensing sub-frame according to the change rate of the load state of the LTE system and/or the change rate of the load state of the other systems detected by the second detecting unit in real time.

Specifically, the change rate of the load state of the LTE system is inversely proportional to the period of the sensing sub-frame; and the change rate of the load state of the other systems is inversely proportional to the period of the sensing sub-frame.

In the technical solution, by dynamically setting the period of the channel sensing sub-frame according to the change rate of the load state of the LTE system and/or the change rate of the load state of the other systems detected in real time, the period of the channel sensing sub-frame can better comply with the operation state of the LTE system. Specifically, the higher the change rate of the load state of the LTE system is, the more greatly the transmission quantity of the downlink data is changed; and the higher the change rate of the load state of the other systems is, the more greatly the channel state is changed. Therefore, in order to transmit downlink data, it is necessary to measure the channel state at a short time interval, i.e. it is necessary to set a short period of the channel sensing sub-frame.

In the above technical solution, preferably, the period of the sensing sub-frame is: $N \times 10$ ms or $M \times 1$ ms, where N is a positive integer, and M is a positive integer from 1 to 9.

Preferably, the above technical solution further includes: a first judging unit, for judging whether it is necessary to process downlink traffic or not; and the first processing unit is specifically used for, when the first judging unit determines that it is necessary to process the downlink traffic, periodically sensing the state of the downlink channel via the channel sensing sub-frame of the frame structure.

In the technical solution, specifically, the base station can sense the state of the downlink channel via the channel sensing sub-frame only when determining that there is downlink traffic, and can, of course, do the same all along regardless of whether there is downlink traffic or not.

Preferably, the above technical solution further includes: a second judging unit, for judging whether the device having a base station function and other devices having a base station function belong to a same operator; and a second processing unit, for, when the second judging unit determines that the device having a base station function and the other devices belong to a same operator, setting the channel sensing sub-frame at a same position in the frame structure of the device having a base station function on a same carrier frequency as the position of the channel sensing sub-frame configured by the other devices in the frame structure of the other devices; or when the second judging unit determines that the device having a base station function and the other devices belong to different operators, setting the channel sensing sub-frame at a different position in the frame structure of the device having a base station function on a same carrier frequency from the position of the channel sensing sub-frame configured by the other devices in the frame structure of the other devices.

In the technical solution, because channel detection aims to detect whether a base station of another operator, which may also be a device having a base station function, (To facilitate description, a base station is taken as an example hereinafter, but those skilled in the art should understand that the base station in this application may also be another device having a base station function) uses LAA, and whether Wi-Fi occupies channels, for a base station of a same operator, by configuring channel sensing sub-frames at a same position in a frame structure on a same carrier frequency, it is possible to avoid determining that a channel is busy because base stations belonging to a same operator detect signals of each other; and for base stations of different operators, it is necessary to set channel sensing sub-frames at different positions in a frame structure, so as to detect whether base stations of different operators occupy channels.

According to a third aspect, the present disclosure further proposes a device having a base station function, including an electronic device for when the LTE system in any one of the above technical solutions operates using a supplemental downlink mode in an unlicensed frequency band.

According to a four aspect, the present disclosure further provides an electronic device for when an LTE system operates using a supplemental downlink mode in an unlicensed frequency band, applicable to a device having a base station function, including at least one processor; and a memory communicably connected with the at least one processor for storing instructions executable by the at least one processor, and at least one radio frequency module communicably connected with the at least one processor, wherein, execution of the instructions by the at least one processor causes the at least one processor to:

arrange a channel sensing sub-frame used for periodically sensing a downlink channel state in a frame structure used only for downlink transmission frequency division duplexing; and within any period, if the channel sensing sub-frame detects that the downlink channel is in an idle state, send downlink data via a downlink sub-frame located within the any period in the frame structure, or otherwise, fail to send downlink data within the any period; and the first arranging unit is specifically used for arranging the channel sensing sub-frame within at least one of downlink sub-frames of the frame structure.

In the electronic device for when an LTE system operates using a supplemental downlink mode in an unlicensed frequency band, optionally, the at least one processor is further caused to arrange a guard period occupying a predetermined length of time in each downlink sub-frame of the at least one of the downlink sub-frames, wherein the channel sensing sub-frame is arranged behind a symbol occupied by the guard period, and occupies a predetermined number of symbols.

In the electronic device for when an LTE system operates using a supplemental downlink mode in an unlicensed frequency band, optionally, the predetermined length of time is greater than 0 and is less than or equal to a length of time occupied by 10 symbols, the predetermined number is from 1 to 13, and the sum of the predetermined length of time and the length of time occupied by the channel sensing sub-frame is less than or equal to 1 ms.

In the electronic device for when an LTE system operates using a supplemental downlink mode in an unlicensed frequency band, optionally, the symbols occupied by the guard period and the symbols occupied by the channel sensing sub-frame are located at the front-end or back-end of each of the downlink sub-frames, and other symbols within each of the downlink sub-frames are used for transmitting downlink data.

In the electronic device for when an LTE system operates using a supplemental downlink mode in an unlicensed frequency band, optionally, the at least one processor is further caused to in the operation process of the LTE system, set the number of symbols occupied by the channel sensing sub-frame as a fixed value; or in the operation process of the LTE system, detect a change rate of channel conditions of other systems using the unlicensed frequency band around the LTE system in real time; and dynamically set the number of symbols occupied by the channel sensing sub-frame according to the change rate of channel conditions of the other systems detected by the first detecting unit in real time and/or the channel detectability of the device having a base station function.

In the electronic device for when an LTE system operates using a supplemental downlink mode in an unlicensed frequency band, optionally, the at least one processor is further caused to in the operation process of the LTE system, detect a change rate of a load state of the LTE system and a change rate of a load state of other systems using the unlicensed frequency band around the LTE system in real time; and dynamically set the period of the channel sensing sub-frame according to the change rate of the load state of the LTE system and/or the change rate of the load state of the other systems detected by the second detecting unit in real time.

In the electronic device for when the LTE system operates using a supplemental downlink mode in an unlicensed frequency band, optionally, the period of the sensing sub-frame is:

N×10 ms or M×1 ms, wherein N is a positive integer, and M is a positive integer from 1 to 9.

In the electronic device for when an LTE system operates using a supplemental downlink mode in an unlicensed frequency band, optionally, the at least one processor is further caused to judge whether it is necessary to process downlink traffic or not; and when determining that it is necessary to process the downlink traffic, periodically sense the state of the downlink channel via the channel sensing sub-frame of the frame structure.

In the electronic device for when an LTE system operates using a supplemental downlink mode in an unlicensed frequency band, optionally, the at least one processor is further caused to judge whether the device having a base station function and other devices having a base station function belong to a same operator; and when the second judging unit determines that the device having a base station function and the other devices belong to a same operator, set the channel sensing sub-frame at a same position in the frame structure of the device having a base station function on a same carrier frequency as the position of the channel sensing sub-frame configured by the other devices in the frame structure of the other devices, or when determining that the device having a base station function and the other devices belong to different operators, setting the channel sensing sub-frame at a different position in the frame structure of the device having a base station function on a same carrier frequency from the position of the channel sensing sub-frame configured by the other devices in the frame structure of the other devices.

According to a fifth aspect, the present disclosure further provides a device having a base station function, including: any one of the abovementioned electronic devices for when an LTE system operates using a supplemental downlink mode in an unlicensed frequency band.

On the premise that normal operation of the LTE system by means of the supplemental downlink mode in the unlicensed frequency band can be ensured, the above technical solution prevents the LTE system from generating significant interference with regard to other systems when operating in the unlicensed frequency band, thereby implementing peaceful coexistence of the LTE system and the other systems in the unlicensed frequency band.

DESCRIPTION OF THE EMBODIMENTS

For a better understanding of the aforementioned objects, features and advantages of the present disclosure, the present disclosure is further described in detail below in conjunction with the drawings and embodiments. It is necessary to indicate that, in case of no conflict, the embodiments of the present application and the features of the embodiments can be mutually combined.

Many specific details are described in the following description in order to fully understand the present disclosure. However, the present disclosure can also be implemented in other ways different from those described herein. Therefore, the scope of protection of the present disclosure is not limited to the embodiments disclosed below.

Figure 1:
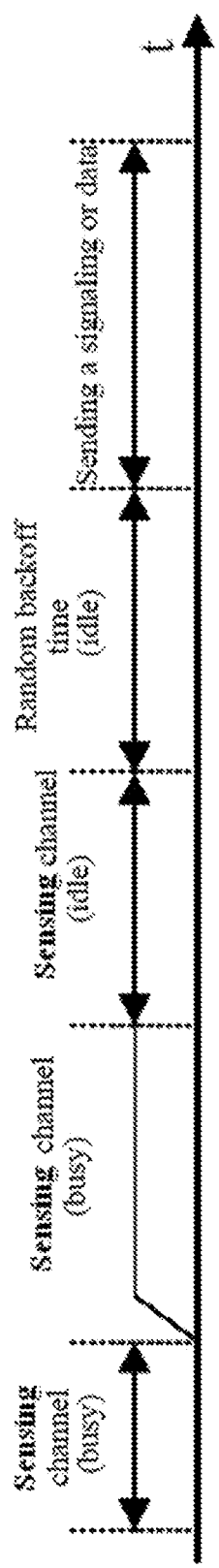
FIG. 1 shows a schematic diagram of interference avoidance regulations of a Wi-Fi system.
Figure 2:
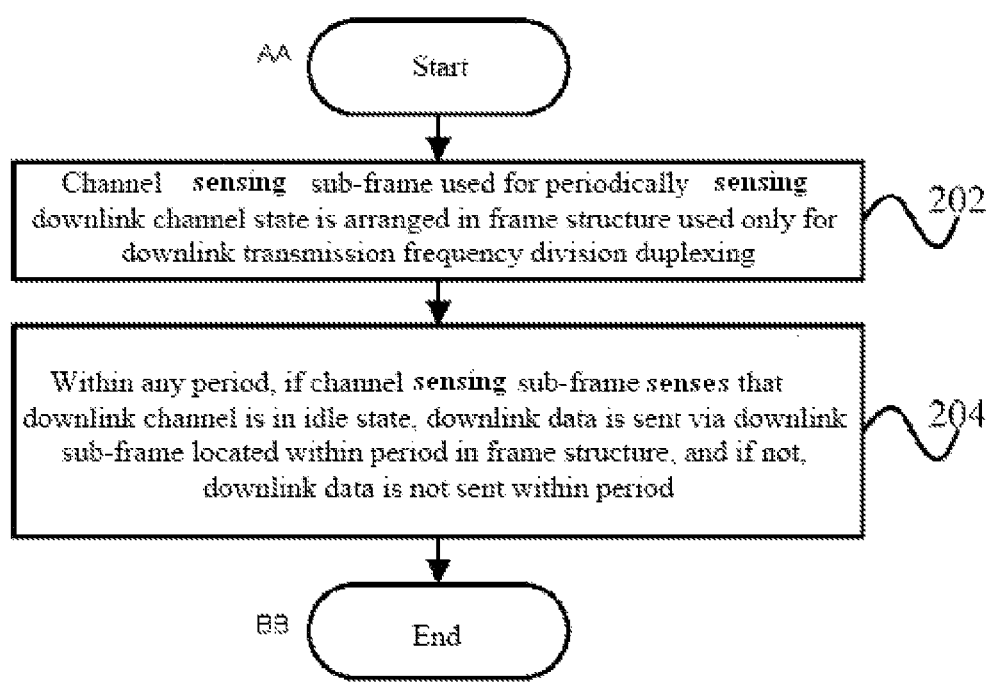
FIG. 2 shows a schematic flow diagram of a data transmission method for when an LTE system operates using a supplemental downlink mode in an unlicensed frequency band, applicable to a device having a base station function, according to an embodiment of the present disclosure.

FIG. 2 shows a schematic flow diagram of a data transmission method for when an LTE system operates using a supplemental downlink mode in an unlicensed frequency band, applicable to a device having a base station function, according to an embodiment of the present disclosure.

As shown in FIG. 2, according to an embodiment of the present disclosure, a data transmission method for when an LTE system operates using a supplemental downlink mode in an unlicensed frequency band, applicable to a device having a base station function, includes: step 202, a channel sensing sub-frame used for periodically sensing a downlink channel state is arranged in a frame structure used only for downlink transmission frequency division duplexing; and step 204, within any period, if the channel sensing sub-frame senses that the downlink channel is in an idle state, downlink data is sent via a downlink sub-frame located within the any period in the frame structure, or otherwise, downlink data is not sent within the any period. In the technical solution, by arranging a channel sensing sub-frame used for sensing a downlink channel state in a frame structure used only for downlink transmission frequency division duplexing, so as to send downlink data via a downlink sub-frame in the above frame structure when the channel sensing sub-frame senses that the downlink channel is in an idle state, or fail to send downlink data when the channel sensing sub-frame senses that the downlink channel is in a busy state, the LTE system can adopt a corresponding interference avoidance mechanism when operating using a supplemental downlink mode in an unlicensed frequency band, and then can peacefully coexist with other systems (e.g. a Wi-Fi system) operating in the unlicensed frequency band when operating in the unlicensed frequency band, so as to, on the premise that normal operation of the LTE system by means of the supplemental downlink mode in the unlicensed frequency band can be ensured, prevent the LTE system from generating significant interference with regard to other systems having a interference avoidance mechanism when operating in the unlicensed frequency band because of no interference avoidance mechanism. The data therein includes not only general interactive data, but also control signalings, etc. The device having a base station function includes a base station, a microcell base station implemented through a communication device (e.g. a smartphone or the like), and the like.

In the above technical solution, preferably, the channel sensing sub-frame is arranged within at least one of downlink sub-frames of the frame structure.

In the technical solution, by arranging the channel sensing sub-frame within at least one of downlink sub-frames of the frame structure used only for downlink transmission frequency division duplexing, it is not necessary to additionally arrange other sub-frames to bear the channel sensing sub-frame in the frame structure for frequency division duplexing; furthermore, the channel sensing sub-frame can be arranged within one or a plurality of downlink sub-frames of the frame structure for frequency division duplexing according to the practical situation of the LTE system.

In the above technical solution, preferably, a guard period occupying a predetermined length of time is arranged in each downlink sub-frame of the at least one of the downlink sub-frames. The channel sensing sub-frame is arranged behind a symbol occupied by the guard period, and occupies a predetermined number of symbols.

In the technical solution, because in the frame structure, it is necessary to set a guard period when a downlink sub-frame is converted to an uplink sub-frame, and the channel sensing sub-frame needs to monitor an uplink signal to detect a channel state, when the channel sensing sub-frame is arranged in the frame structure used only for downlink transmission frequency division duplexing, it is necessary to set a guard period to achieve conversion from downlink to uplink.

In the above technical solution, preferably, the predetermined length of time is greater than 0 and is less than or equal to a length of time occupied by 10 symbols, the predetermined number is from 1 to 13, and the sum of the predetermined length of time and the length of time occupied by the channel sensing sub-frame is less than or equal to 1 ms.

In the technical solution, one sub-frame contains 14 symbols, the length of time occupied by the guard period is greater than 0 and is less than a length of time occupied by 10 symbols, and the number of symbols occupied by the channel sensing sub-frame must be an integer. Therefore, the length of time occupied by the guard period is greater than 0 and is less than or equal to a length of time occupied by 10 symbols, and the number of symbols occupied by the channel sensing sub-frame is from 1 to 13.

In the above technical solution, preferably, the symbols occupied by the guard period and the symbols occupied by the channel sensing sub-frame are located at the front-end or back-end of each of the downlink sub-frames, and other symbols within each of the downlink sub-frames are used for transmitting downlink data.

In the above technical solution, preferably, if the channel sensing sub-frame senses in each occupied symbol that the downlink channel is in an idle state, then the downlink channel is determined to be in an idle state, or otherwise, the downlink channel is determined to be in a busy state.

In the technical solution, the channel sensing sub-frame senses 1 symbol once. Therefore, when the channel sensing sub-frame senses in each occupied symbol that a downlink channel is in an idle state, then the downlink channel is determined to be in an idle state.

The number of symbols occupied by the channel sensing sub-frame is set as follows:

Preferably, the above technical solution further includes: in the operation process of the LTE system, the number of symbols occupied by the channel sensing sub-frame is a fixed value; or in the operation process of the LTE system, a change rate of channel conditions of other systems using the unlicensed frequency band around the LTE system is detected in real time, and the number of symbols occupied by the channel sensing sub-frame is dynamically set according to the change rate of channel conditions of the other systems detected in real time and/or the channel detectability of the device having a base station function.

Specifically, the change rate of channel conditions of the other systems is directly proportional to the number of symbols occupied by the channel sensing sub-frame; and the channel detectability of the device having a base station function is inversely proportional to the number of symbols occupied by the channel sensing sub-frame.

In the technical solution, the number of symbols occupied by the channel sensing sub-frame can be a fixed value or can be adjusted according to the actual situation in the operation process of the LTE. When the number of symbols occupied by the channel sensing sub-frame is adjusted according to the actual situation, in order to accurately measure the state of a downlink channel, if a change rate of channel conditions of other systems using an unlicensed frequency band around an LTE system is fast, then it is necessary to measure the state of the downlink channel many times, namely, a high number of symbols occupied by the channel sensing sub-frame is set; and if the channel detectability of the LTE system is poor, it is also necessary to measure the state of the downlink channel many times, namely, a high number of symbols occupied by the channel sensing sub-frame is set. Therefore, the change rate of channel conditions of the other systems is directly proportional to the number of symbols occupied by the channel sensing sub-frame, and the channel detectability of the device having a base station function is inversely proportional to the number of symbols occupied by the channel sensing sub-frame.

A period of the channel sensing sub-frame is set as follows:

Preferably, the above technical solution further includes: in the operation process of the LTE system, detecting a change rate of a load state of the LTE system and a change rate of a load state of other systems using the unlicensed frequency band around the LTE system in real time, and dynamically setting a period of the channel sensing sub-frame according to the change rate of the load state of the LTE system and/or the change rate of the load state of the other systems detected in real time.

Specifically, the change rate of the load state of the LTE system is inversely proportional to the period of the sensing sub-frame; and the change rate of the load state of the other systems is inversely proportional to the period of the sensing sub-frame.

In the technical solution, by dynamically setting the period of the channel sensing sub-frame according to the change rate of the load state of the LTE system and/or the change rate of the load state of the other systems detected in real time, the period of the channel sensing sub-frame can better comply with the operation state of the LTE system. Specifically, the higher the change rate of the load state of the LTE system is, the more greatly the transmission quantity of the downlink data is changed; and the higher the change rate of the load state of the other systems is, the more greatly the channel state is changed. Therefore, in order to transmit downlink data, it is necessary to measure the channel state at a short time interval, i.e. it is necessary to set a short period of the channel sensing sub-frame.

In the above technical solution, preferably, the period of the sensing sub-frame is: N×10 ms or M×1 ms, where N is a positive integer, and M is a positive integer from 1 to 9.

Preferably, the above technical solution further includes: judging whether it is necessary to process downlink traffic or not, and if it is necessary to process downlink traffic, then periodically sensing the state of the downlink channel via the channel sensing sub-frame of the frame structure.

In the technical solution, specifically, the base station can sense the state of the downlink channel via the channel sensing sub-frame only when determining that there is downlink traffic, and can, of course, do the same all along regardless of whether there is downlink traffic or not.

Preferably, the above technical solution further includes: judging whether the base station and other devices having a base station function belong to a same operator; and if determining that the device and the other devices belong to a same operator, setting the channel sensing sub-frame at a same position in the frame structure of the device having a base station function on a same carrier frequency as the position of the channel sensing sub-frame configured by the other devices in the frame structure of the other devices; or if determining that the device and the other devices belong to different operators, setting the channel sensing sub-frame at a different position in the frame structure of the device having a base station function on a same carrier frequency from the position of the channel sensing sub-frame configured by the other devices in the frame structure of the other devices.

In the technical solution, because channel detection aims to detect whether a base station of another operator, which may also be a device having a base station function, (To facilitate description, a base station is taken as an example hereinafter, but those skilled in the art should understand that the base station in this application may also be another device having a base station function) uses LAA, and whether Wi-Fi occupies channels, for a base station of a same operator, by configuring channel sensing sub-frames at a same position in a frame structure on a same carrier frequency, it is possible to avoid determining that a channel is busy because base stations belonging to a same operator detect signals of each other; and for base stations of different operators, it is necessary to set channel sensing sub-frames at different positions in a frame structure, so as to detect whether base stations of different operators occupy channels.

Figure 3:
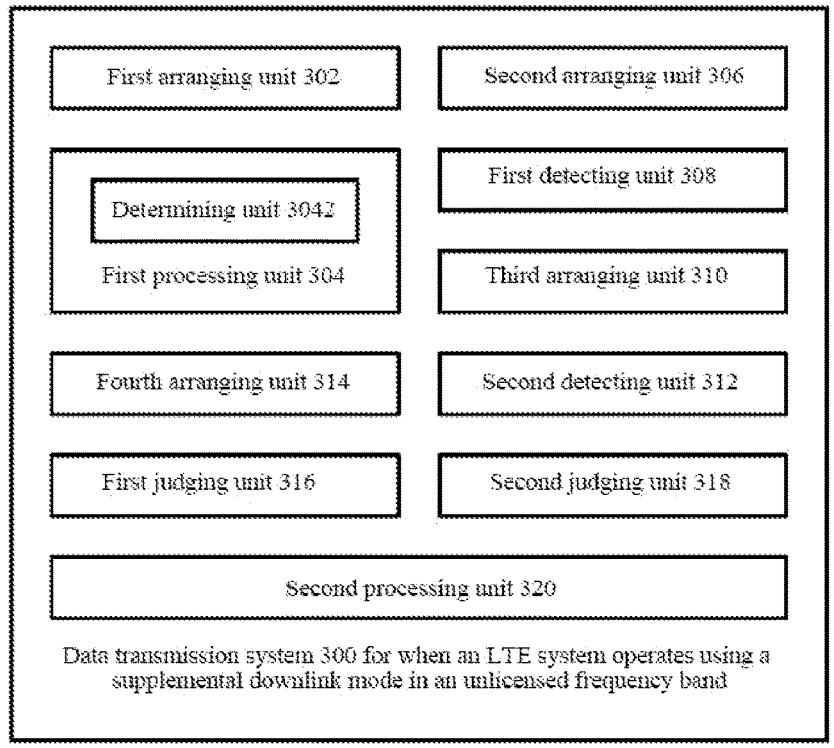
FIG. 3 shows a schematic block diagram of an electronic device for when an LTE system operates using a supplemental downlink mode in an unlicensed frequency band, applicable to a device having a base station function, according to an embodiment of the present disclosure.

FIG. 3 shows a schematic block diagram of an electronic device for when an LTE system operates using a supplemental downlink mode in an unlicensed frequency band, applicable to a device having a base station function, according to an embodiment of the present disclosure.

As shown in FIG. 3, according to an embodiment of the present disclosure, an electronic device 300 for when an LTE system operates using a supplemental downlink mode in an unlicensed frequency band, applicable to a device having a base station function, includes: a first arranging unit 302, for arranging a channel sensing sub-frame used for periodically sensing a downlink channel state in a frame structure used only for downlink transmission frequency division duplexing; and a first processing unit 304, for, within any period, if the channel sensing sub-frame senses that the downlink channel is in an idle state, sending downlink data via a downlink sub-frame located within the any period in the frame structure, or otherwise, failing to send downlink data within the any period.

In the technical solution, by arranging a channel sensing sub-frame used for sensing a downlink channel state in a frame structure used only for downlink transmission frequency division duplexing, so as to send downlink data via a downlink sub-frame in the above frame structure when the channel sensing sub-frame senses that the downlink channel is in an idle state, or fail to send downlink data when the channel sensing sub-frame senses that the downlink channel is in a busy state, the LTE system can adopt a corresponding interference avoidance mechanism when operating using a supplemental downlink mode in an unlicensed frequency band, and then can peacefully coexist with other systems (e.g. a Wi-Fi system) operating in the unlicensed frequency band when operating in the unlicensed frequency band, so as to, on the premise that normal operation of the LTE system by means of the supplemental downlink mode in the unlicensed frequency band can be ensured, prevent the LTE system from generating significant interference with regard to other systems having a interference avoidance mechanism when operating in the unlicensed frequency band because of no interference avoidance mechanism. The data therein includes not only general interactive data, but also control signalings, etc. The device having a base station function includes a base station, a microcell base station implemented through a communication device (e.g. a smartphone or the like), and the like.

In the above technical solution, preferably, the first arranging unit 302 is specifically used for arranging the channel sensing sub-frame within at least one of downlink sub-frames of the frame structure.

In the technical solution, by arranging the channel sensing sub-frame within at least one of downlink sub-frames of the frame structure used only for downlink transmission frequency division duplexing, it is not necessary to additionally arrange other sub-frames to bear the channel sensing sub-frame in the frame structure for frequency division duplexing; furthermore, the channel sensing sub-frame can be arranged within one or a plurality of downlink sub-frames of the frame structure for frequency division duplexing according to the practical situation of the LTE system.

In the above technical solution, preferably, the first arranging unit 302 is further used for arranging a guard period occupying a predetermined length of time in each downlink sub-frame of the at least one of the downlink sub-frames, wherein the channel sensing sub-frame is arranged behind a symbol occupied by the guard period, and occupies a predetermined number of symbols.

In the technical solution, because in the frame structure, it is necessary to set a guard period when a downlink sub-frame is converted to an uplink sub-frame, and the channel sensing sub-frame needs to monitor an uplink signal to detect a channel state, when the channel sensing sub-frame is arranged in the frame structure used only for downlink transmission frequency division duplexing, it is necessary to set a guard period to achieve conversion from downlink to uplink.

In the above technical solution, preferably, the predetermined length of time is greater than 0 and is less than or equal to a length of time occupied by 10 symbols, the predetermined number is from 1 to 13, and the sum of the predetermined length of time and the length of time occupied by the channel sensing sub-frame is less than or equal to 1 ms.

In the technical solution, one sub-frame contains 14 symbols, the length of time occupied by the guard period is greater than 0 and is less than a length of time occupied by 10 symbols, and the number of symbols occupied by the channel sensing sub-frame must be an integer. Therefore, the length of time occupied by the guard period is greater than 0 and is less than or equal to a length of time occupied by 10 symbols, and the number of symbols occupied by the channel sensing sub-frame is from 1 to 13.

In the above technical solution, preferably, the symbols occupied by the guard period and the symbols occupied by the channel sensing sub-frame are located at the front-end or back-end of each of the downlink sub-frames, and other symbols within each of the downlink sub-frames are used for transmitting downlink data.

In the above technical solution, preferably, the first processing unit 304 includes a determining unit 3042, for, when the channel sensing sub-frame senses in each occupied symbol that a downlink channel is in an idle state, determining that the downlink channel is in an idle state, or otherwise, determining that the downlink channel is in a busy state.

In the technical solution, the channel sensing sub-frame senses 1 symbol once. Therefore, when the channel sensing sub-frame senses in each occupied symbol that a downlink channel is in an idle state, then the downlink channel is determined to be in an idle state.

The number of symbols occupied by the channel sensing sub-frame is set as follows:

Preferably, the above technical solution further includes: a second arranging unit 306, for, in the operation process of the LTE system, arranging the number of symbols occupied by the channel sensing sub-frame as a fixed value; or a first detecting unit 308, for, in the operation process of the LTE system, detecting a change rate of channel conditions of other systems using the unlicensed frequency band around the LTE system in real time, and a third arranging unit 310, for dynamically setting the number of symbols occupied by the channel sensing sub-frame according to the change rate of channel conditions of the other systems detected by the first detecting unit 308 in real time and/or the channel detectability of the device having a base station function.

Specifically, the change rate of channel conditions of the other systems is directly proportional to the number of symbols occupied by the channel sensing sub-frame; and the channel detectability of the device having a base station function is inversely proportional to the number of symbols occupied by the channel sensing sub-frame.

In the technical solution, the number of symbols occupied by the channel sensing sub-frame can be a fixed value or can be adjusted according to the actual situation in the operation process of the LTE. When the number of symbols occupied by the channel sensing sub-frame is adjusted according to the actual situation, in order to accurately measure the state of a downlink channel, if a change rate of channel conditions of other systems using an unlicensed frequency band around an LTE system is fast, then it is necessary to measure the state of a downlink channel many times, namely, a high number of symbols occupied by the channel sensing sub-frame is set; and if the channel detectability of an LTE system is poor, it is also necessary to measure the state of a downlink channel many times, namely, a high number of symbols occupied by the channel sensing sub-frame is set. Therefore, the change rate of channel conditions of the other systems is directly proportional to the number of symbols occupied by the channel sensing sub-frame, and the channel detectability of the device having a base station function is inversely proportional to the number of symbols occupied by the channel sensing sub-frame.

A period of the channel sensing sub-frame is set as follows:

Preferably, the above technical solution further includes: a second detecting unit 312, for, in the operation process of the LTE system, detecting a change rate of a load state of the LTE system and a change rate of a load state of other systems using the unlicensed frequency band around the LTE system in real time; and a fourth arranging unit 314, for dynamically setting the period of the channel sensing sub-frame according to the change rate of the load state of the LTE system and/or the change rate of the load state of the other systems detected by the second detecting unit 312 in real time.

Specifically, the change rate of the load state of the LTE system is inversely proportional to the period of the sensing sub-frame; and the change rate of the load state of the other systems is inversely proportional to the period of the sensing sub-frame.

In the technical solution, by dynamically setting the period of the channel sensing sub-frame according to the change rate of the load state of the LTE system and/or the change rate of the load state of the other systems detected in real time, the period of the channel sensing sub-frame can better comply with the operation state of the LTE system. Specifically, the higher the change rate of the load state of the LTE system is, the more greatly the transmission quantity of the downlink data is changed; and the higher the change rate of the load state of the other systems is, the more greatly the state of the channel is changed. Therefore, in order to transmit downlink data, it is necessary to measure a channel state at a short time interval, i.e. it is necessary to set a short period of the channel sensing sub-frame.

In the above technical solution, preferably, the period of the sensing sub-frame is: N×10 ms or M×1 ms, where N is a positive integer, and M is a positive integer from 1 to 9.

Preferably, the above technical solution further includes: a first judging unit 316, for judging whether it is necessary to process downlink traffic; and the first processing unit 304 is specifically used for, when the first judging unit 316 determines that it is necessary to process the downlink traffic, periodically sensing the state of the downlink channel via the channel sensing sub-frame of the frame structure.

In the technical solution, specifically, the base station can sense the state of the downlink channel via the channel sensing sub-frame only when determining that there is downlink traffic, and can, of course, do the same all along regardless of whether there is downlink traffic or not.

Preferably, the above technical solution further includes: a second judging unit 318, for judging whether the device having a base station function and other devices having a base station function belong to a same operator; and a second processing unit 320, for, when the second judging unit 318 determines that the device having a base station function and the other devices belong to a same operator, setting the channel sensing sub-frame at a same position in the frame structure of the device having a base station function on a same carrier frequency as the position of the channel sensing sub-frame configured by the other devices in the frame structure of the other devices; or when the second judging unit 318 determines that the device having a base station function and the other devices belong to different operators, setting the channel sensing sub-frame at a different position in the frame structure of the device having a base station function on a same carrier frequency from the position of the channel sensing sub-frame configured by the other devices in the frame structure of the other devices.

In the technical solution, because channel detection aims to detect whether a base station of another operator, which may also be a device having a base station function, (To facilitate description, a base station is taken as an example hereinafter, but those skilled in the art should understand that the base station in this application may also be another device having a base station function) uses LAA, and whether Wi-Fi occupies channels, for a base station of a same operator, by configuring channel sensing sub-frames at a same position in a frame structure on a same carrier frequency, it is possible to avoid determining that a channel is busy because base stations belonging to a same operator detect signals of each other; and for base stations of different operators, it is necessary to set channel sensing sub-frames at different positions in a frame structure, so as to detect whether base stations of different operators occupy channels.

The present disclosure further proposes a device having a base station function (not shown in the figure), including an electronic device 300 for when the LTE system shown in FIG. 3 operates using a supplemental downlink mode in an unlicensed frequency band.

The technical solutions of the present disclosure are described in detail in conjunction with FIG. 4 to FIG. 7.

The technical solutions of the present disclosure are mainly an interference avoidance mechanism when an unlicensed frequency band is used by an LTE system by way of SDL. The main principle is to design an LBT (i.e. channel sensing sub-frame) mechanism and a frame structure for measuring a downlink channel. The technical solutions mainly introduce LBT subjects, LBT time and LBT periods, as well as a maximum transmittable length of time or a packet size if a channel is idle.

Since an LTE system uses a 10 ms frame structure, a repetition period of LBT detection time is based on a 10 ms radio frame.

Figure 4:
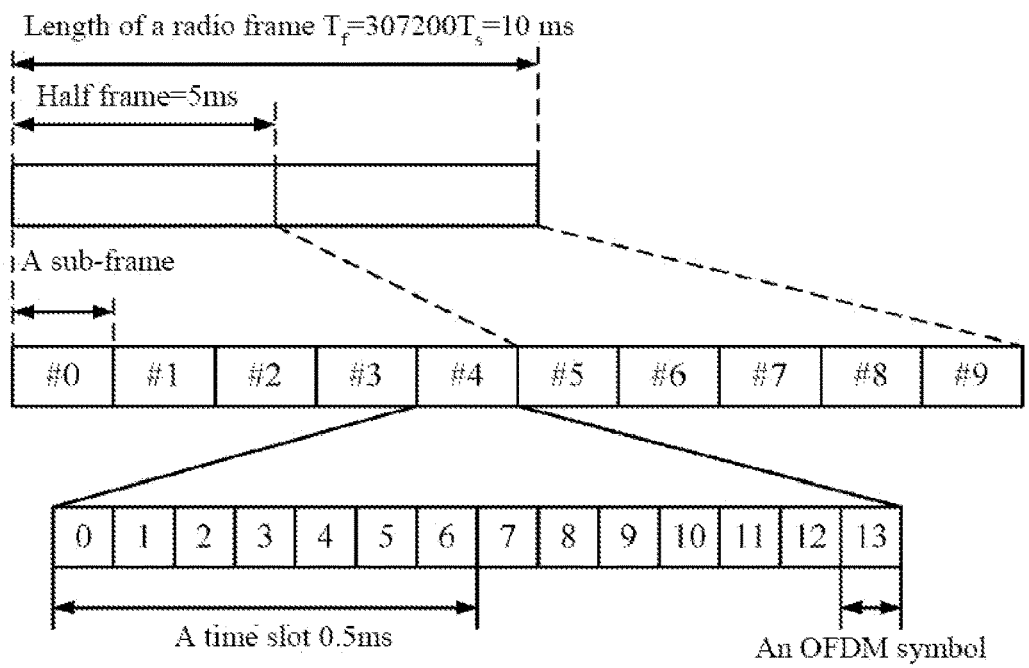
FIG. 4 shows a schematic diagram of a 10 ms frame structure of an LTE system.

The 10 ms frame structure of the LTE system is as shown in FIG. 4, 1 frame structure contains 10 sub-frames, and each sub-frame further contains 14 symbols.

A period of a channel sensing sub-frame may be N×10 ms (N is 1, 2, 3, 4 . . . ). Specifically, the value of N may be set based on a change rate of a system load, and if a dynamic change of a load is fast, a smaller value may be set for N; or if a dynamic change of a load is very slow, a larger value may be set for N.

Figure 5:
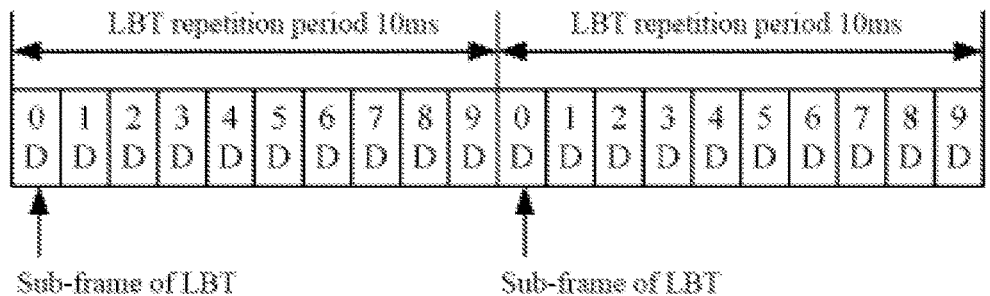
FIG. 5 shows a schematic diagram of a structure of a channel sensing sub-frame having a 10 ms period according to an embodiment of the present disclosure.

FIG. 5 shows a schematic diagram of a channel sensing sub-frame having a period of 10 ms. In the figure, assume that LBT is carried out in #0 sub-frame of each period.

to uplink time for sensing channels. Besides, another part is used for guard period when a DL (Downlink) sub-frame is converted to an UL (Uplink) sub-frame, similar to a GP (Guard Period) in a special sub-frame when a downlink sub-frame in uplink and downlink configurations of a TDD system is converted to an uplink sub-frame.

Figure 7:
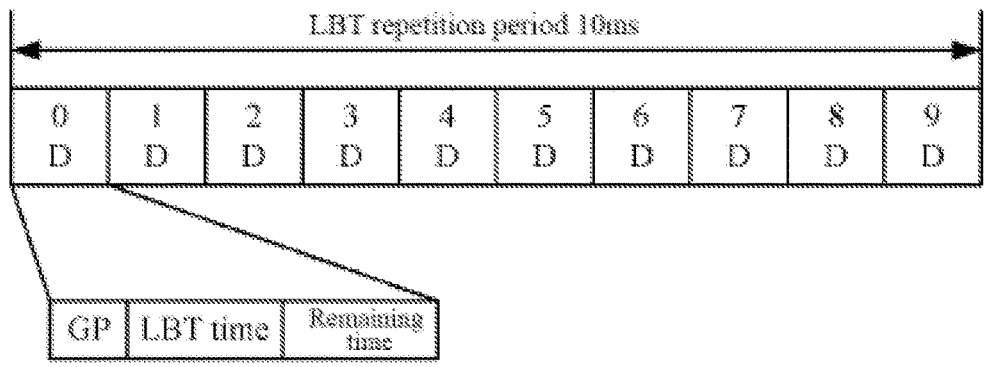
FIG. 7 shows a schematic diagram of a frame structure equipped with a channel sensing sub-frame according to an embodiment of the present disclosure.

The sub-frame of an LBT may be located in any downlink frame of a frame structure. A structure of an LBT in a sub-frame is as shown in FIG. 7, that is, a sub-frame contains GP, LBT time and remaining time.

GP is a guard period from a downlink sub-frame in front of an LBT sub-frame to LBT time (LBT time is used as uplink time). The length of this guard period may be 1 time slot, i.e. 0.5 ms, may also be selected according to a cell size, and may be, for example, various possible values according to the GP of TDD provided in 36.211. Table 1 provides configurations of DwPTS (Downlink Pilot Time Slot) and UpPTS (Uplink Pilot Time Slot) in a special sub-frame of TDD in 36.211, and the GP value is 1 ms-DwPTS-UpPTS, 1 ms=30720*Ts. As concluded from Table 1, the minimum value of GP can be less than the length of 1 symbol, and the maximum value of GP can be the length of 10 symbols. Because 1 sub-frame contains 14 symbols, the GP value can be 0 symbol to 10 symbols.

TABLE 1

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · Ts | 2192 · Ts | 2560 · Ts | 7680 · Ts | 2192Ts | 2560-Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | | |
| 5 | 6592 · Ts | 4384 · Ts | 5120 · Ts | 20480 · Ts | 4384 Ts | 5120Ts |
| 6 | 19760 · Ts | | | 23040 · Ts | | |
| 7 | 21952 · Ts | | | 12800 · Ts | | |
| 8 | 24144 · Ts | | | — | — | — |
| 9 | 13168 · Ts | | | — | — | — |

Of course, if a load changes very fast, a period of LBT may be a×10 ms (a may be 0.1, 0.2, 0.3, . . . , 0.8, 0.9). Likewise, the smaller the value of a is, the shorter the repetition period of LBT is, the longer the time slot occupied by LBT is, and the more frequently the state of transmission or not of each base station (may also be a device having a base station function. In order to facilitate description, a base station is taken as an example hereinafter, but those skilled in the art should understand that the base station in this application may also be other devices having a base station function) is changed.

Figure 6:
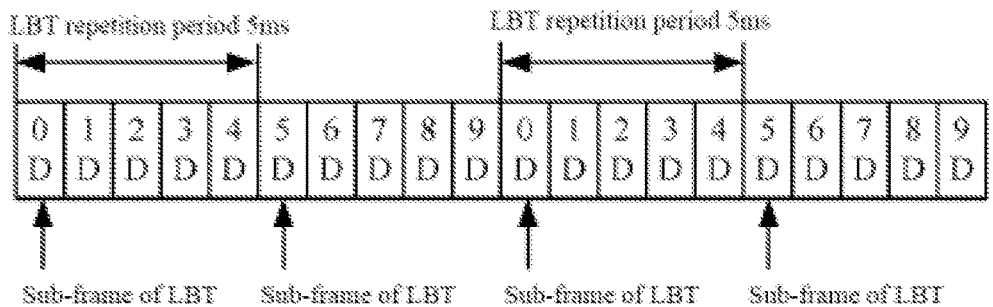
FIG. 6 shows a schematic diagram of a structure of a channel sensing sub-frame having a 5 ms period according to an embodiment of the present disclosure.

FIG. 6 shows a schematic diagram of a channel sensing sub-frame having a period of 5 ms. In the figure, assume that LBT is carried out in #0 sub-frame and #5 sub-frame of each period.

LBT detection time is described in detail below:

When used by an LTE system in an unlicensed frequency band by way of SDL, the LBT time may be in any downlink frame. Because there are only downlink sub-frames in a frame structure, and a base station needs to monitor channels during LBT, it is necessary to convert a part of a sub-frame In the table, the length of GP may be semi-statically or statically configured as required. If an unlicensed frequency band is in a high frequency, is mainly used for small cells, and needs small coverage, then GP prefers a small value, such as 1 symbol. The GP length may also be less than the time occupied by 1 symbol, as here GP is practically only used for the time when a base station turns a downlink transmitter into an uplink receiver in an unlicensed frequency spectrum, which can be completed within dozens of microseconds without the need of considering the problem that different users have different uplink transmission and reception time because of different distances from the base station.

LBT time means the length of time when a base station carries out LBT. This length can be 1 symbol to 13 symbols. LBT detects 1 symbol, that is, each symbol is subject to LBT detection once, and judges whether a channel is busy or idle. The whole LBT time may be divided into a plurality of symbols, namely, a plurality of steps. Only when a channel is detected to be idle in each step, can the channel be determined to be in an idle state after the LBT time is completed.

Specifically, the LBT time length may be 1 symbol, namely, a step.

Specifically, the LBT time length may be 1 time slot, namely, 0.5 ms, which is also 7 symbols.

The LBT time length may be semi-statically or statically configured as required.

The remaining time is the time remaining within 1 ms except the GP and LBT time.

Specifically, the remaining time may be 0, for example, GP and LBT time respectively occupies 0.5 ms.

The remaining time may also be long. For example, when the GP and LBT time length respectively occupies 1 symbol, the remaining time is 12 symbols.

The remaining time can be used for downlink transmission, including transmission of a PSS/SSS (primary synchronization signal/secondary synchronization signal), a CRS (cell-specific reference signal), a CSI-RS (channel state information-reference signal), a DS (discovery signal), PDCCH (physical downlink control channel), an ePDCCH (enhanced physical downlink control channel) and a PDSCH (physical downlink shared channel) or a beacon signal similar to WiFi. Wherein, the downlink data may not include PDSCH, only include discovery signal, A variety of configurations may be set for the GP length, LBT time length and remaining time length in an LBT sub-frame, so that each cell can statically or semi-statically select different configurations depending on different circumstances, as long as the three add up to the length of 1 ms.

There may be a relationship of any combination between various configurations of the above LBT detection time and the repetition period of the LB detection time.

LBT repetition period is composed of an LBT detection sub-frame and other sub-frames, while the other sub-frames are the maximum occupiable channel time after an LBT senses that a channel is idle every time. If a LBT detection sub-frame determines that a channel is idle, then other sub-frames can be used for downlink transmission; otherwise, the other sub-frames cannot be used for downlink transmission. That is, the LBT repetition period limits the maximum time available for downlink transmission when an LBT senses that a channel is idle. If the repetition period is 5 ms, and the LBT detection sub-frame is 1 ms, then the maximum transmission time is 4 ms, and LBT detection needs to be carried out again on completion of 4 ms.

LBT configurations in base stations of a same operator and different operators are described below:

For all base stations or cells of a same operator: when an unlicensed frequency band is used, the LBT time in a same carrier frequency is identical. Because LBT mainly aims to detect whether other operators use LAA in the carrier frequency or whether a Wi-Fi system is used, and base stations of a same operator can simultaneously use an unlicensed frequency band, the fact that the base stations of a same operator carry out LBT at the same time is equivalent to the fact that none of the base stations of the same operator sends a signal, and they only monitor an external signal strength.

For base stations or cells of different operators: when an unlicensed frequency band is used, the LBT time in the same carrier frequency is different. That is to say, when an operator A is carrying out LBT without sending a signal, an operator B may be sending a signal, instead of being carrying out LBT, which can just detect whether the operator B is occupying channels.

In addition, LBT of a base station can be measured based on the period regardless of whether there is downlink traffic or not; and can also be measured based on the period only when there is traffic.

By designing the above downlink LBT detection mechanism of a base station in the present disclosure, when an LTE operates using a supplemental downlink mode in an unlicensed frequency band, the LTE will also sense in advance whether a Wi-Fi device or other systems are using channels, and will not occupy channels if a Wi-Fi device or other systems are using channels, so as to further ensure peaceful coexistence of the LTE system and an existing access technology, such as Wi-Fi, in an unlicensed frequency band.

In order to better perform the data transmission method of the embodiments of the present disclosure, the present disclosure further provides an electronic device 50 for when an LTE system operates using a supplemental downlink mode in an unlicensed frequency band, applicable to a device having a base station function.

Figure 8:
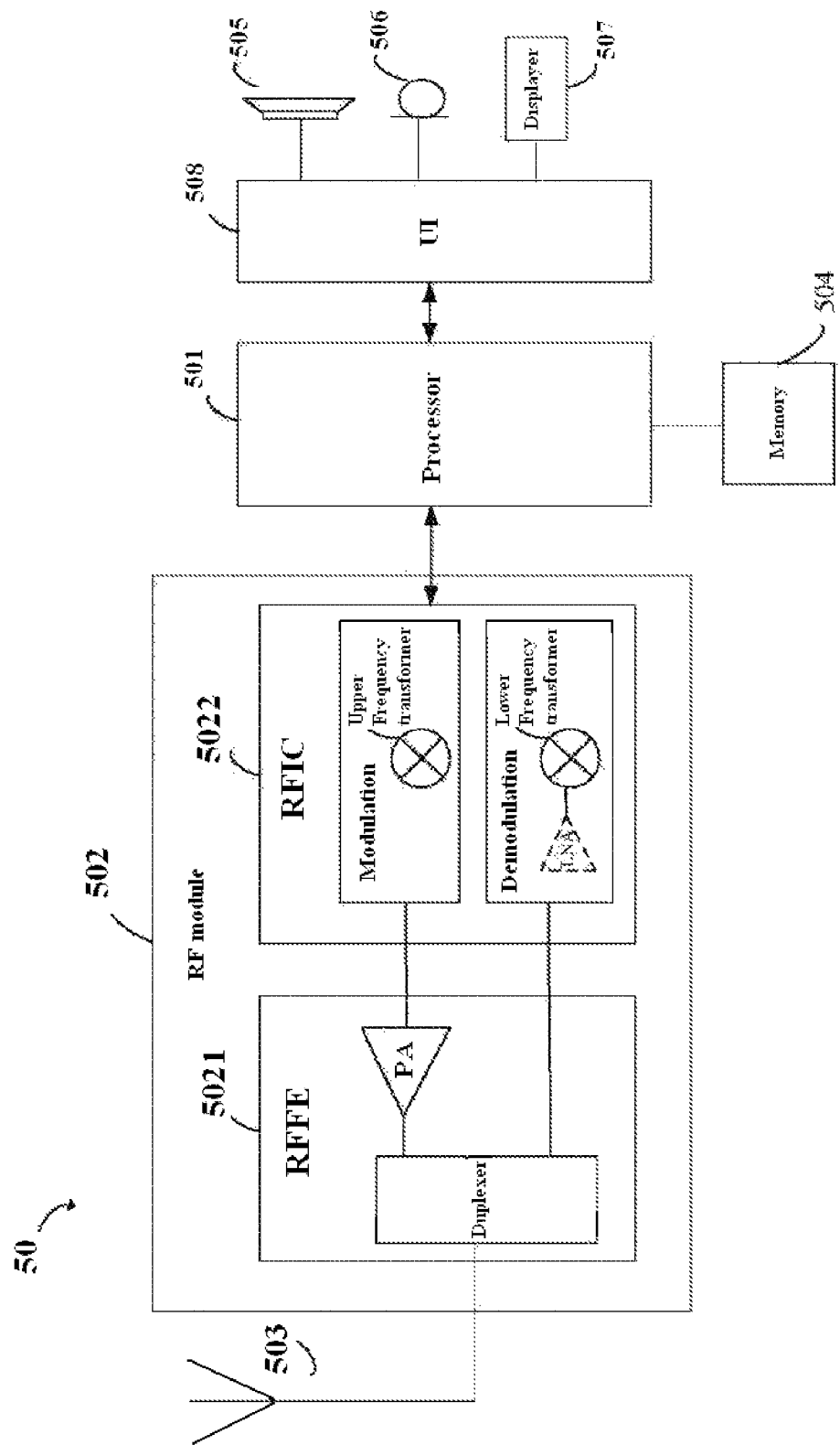
FIG. 8 shows a schematic diagram of an electronic device according to an embodiment of the present disclosure

Referring to FIG. 8 the electronic device includes at least one processor 501, a RF module, an antenna 503, a memory 504, an I/O module and an user interface 508, wherein, the I/O module includes an audio I/O module 505, key input module 506 and a displayer 507, etc). The RF module includes RFFE 5021 and RFIC 5022.

The processor 501 may be a general processor, such as Central Processing Unit (CPU), Digital Signal Processor (DSP), Application Specific Integrated Circuit (ASIC), or at least one integrated circuit for performing the embodiments of the present disclosure. The processor 501 may process the data received by the RF module 502, and the data transmitted to the RF module 502 by the antenna 503.

The RF module 502 is configured to modulate the data sent from the processor 501 before transmitting through the antenna 503 (transmission path), or demodulate idle signal received by the antenna 503 before transmitting to the processor 501 for processing according to communication protocol (receiving path).

RFFE 5021 includes a duplexer and power amplifier (PA), wherein, the duplexer is configured to couple the transmitting path and the receiving path to the antenna 503, to allow the antenna 503 to be used for sending and/or receiving. The power amplifier is configured to generally amplify the power of the sending signal on the transmission path, so as to be able to send out through the antenna 503.

RFIC is a modulation and demodulation unit, configured to modulate low frequency RF signal on the transmission path into high frequency RF signal (this function is achieved by an upper frequency transformer as shown in FIG. 8) and also configured to demodulate high frequency RF signal into base band signal (this function is achieved by an lower frequency transformer), The upper frequency and lower frequency transformer is a frequency mixer, which is able to mix the high frequency RF signal and local oscillation signal together to form base band signal, or mix the base band signal and local oscillation signal together to form the high frequency RF signal.

On the receiving path, before demodulation, a low noise amplifier can also be configured to amplifier the receiving signal.

Bus is an industry standard architecture (ISA) bus, a peripheral component interconnect (PCI) bus, or an extended industry standard architecture (EISA) bus. The Bus can be classified into address bus, date bus, control bus etc.

The memory 504 is configured to store instructions, and transmit the instructions to the CPU. The memory 504 may include a volatile memory, such as a random access memory (RAM), or include a non-volatile memory, such as a read-only memory (ROM), a flash memory, a hard disk drive (HDD) or a solid-state drive (SSD); the memory 504 may also include the combination of the memories mentioned above. The memory 504 is communicably connected with the processor 501.

The I/O module is configured to generally perform the interaction between the electronic device 50 and user, or between the electronic device 50 and external environment, and may include an audio I/O module 505, key input module 506 and a display 507 etc. Specifically, the I/O module may include a camera, a touch screen and a sensor, etc. Wherein, the I/O module is configured to communicate with the processor 501 through a user interface 508.

Wherein, execution of the instructions by the at least one processor 501 causes the at least one processor 501 to arrange a channel sensing sub-frame used for periodically sensing a downlink channel state in a frame structure used only for downlink transmission frequency division duplexing; and within any period, if the channel sensing sub-frame detects that the downlink channel is in an idle state, send downlink data via a downlink sub-frame located within the any period in the frame structure, or otherwise, fail to send downlink data within the any period; and the first arranging unit is specifically used for arranging the channel sensing sub-frame within at least one of downlink sub-frames of the frame structure.

In the electronic device 50 for when an LTE system operates using a supplemental downlink mode in an unlicensed frequency band, optionally, the at least one processor is further caused to arrange a guard period occupying a predetermined length of time in each downlink sub-frame of the at least one of the downlink sub-frames, wherein the channel sensing sub-frame is arranged behind a symbol occupied by the guard period, and occupies a predetermined number of symbols.

In the electronic device 50 for when an LTE system operates using a supplemental downlink mode in an unlicensed frequency band, optionally, the predetermined length of time is greater than 0 and is less than or equal to a length of time occupied by 10 symbols, the predetermined number is from 1 to 13, and the sum of the predetermined length of time and the length of time occupied by the channel sensing sub-frame is less than or equal to 1 ms.

In the electronic device 50 for when an LTE system operates using a supplemental downlink mode in an unlicensed frequency band, optionally, the symbols occupied by the guard period and the symbols occupied by the channel sensing sub-frame are located at the front-end or back-end of each of the downlink sub-frames, and other symbols within each of the downlink sub-frames are used for transmitting downlink data.

In the electronic device 50 for when an LTE system operates using a supplemental downlink mode in an unlicensed frequency band, optionally, the at least one processor is further caused to, in the operation process of the LTE system, set the number of symbols occupied by the channel sensing sub-frame as a fixed value; or in the operation process of the LTE system, detect a change rate of channel conditions of other systems using the unlicensed frequency band around the LTE system in real time; and dynamically set the number of symbols occupied by the channel sensing sub-frame according to the change rate of channel conditions of the other systems detected by the first detecting unit in real time and/or the channel detectability of the device having a base station function.

In the electronic device 50 for when an LTE system operates using a supplemental downlink mode in an unlicensed frequency band, optionally, the at least one processor is further caused to, in the operation process of the LTE system, detect a change rate of a load state of the LTE system and a change rate of a load state of other systems using the unlicensed frequency band around the LTE system in real time; and dynamically set the period of the channel sensing sub-frame according to the change rate of the load state of the LTE system and/or the change rate of the load state of the other systems detected by the second detecting unit in real time.

In the electronic device 50 for when the LTE system operates using a supplemental downlink mode in an unlicensed frequency band, optionally, the period of the sensing sub-frame is N×10 ms or M×1 ms, wherein N is a positive integer, and M is a positive integer from 1 to 9.

In the electronic device 50 for when an LTE system operates using a supplemental downlink mode in an unlicensed frequency band, optionally, the at least one processor is further caused to judge whether it is necessary to process downlink traffic or not; and when determining that it is necessary to process the downlink traffic, periodically sense the state of the downlink channel via the channel sensing sub-frame of the frame structure.

In the electronic device 50 for when an LTE system operates using a supplemental downlink mode in an unlicensed frequency band, optionally, the at least one processor is further caused to judge whether the device having a base station function and other devices having a base station function belong to a same operator; and when the second judging unit determines that the device having a base station function and the other devices belong to a same operator, set the channel sensing sub-frame at a same position in the frame structure of the device having a base station function on a same carrier frequency as the position of the channel sensing sub-frame configured by the other devices in the frame structure of the other devices, or when determining that the device having a base station function and the other devices belong to different operators, setting the channel sensing sub-frame at a different position in the frame structure of the device having a base station function on a same carrier frequency from the position of the channel sensing sub-frame configured by the other devices in the frame structure of the other devices.

Figure 9:
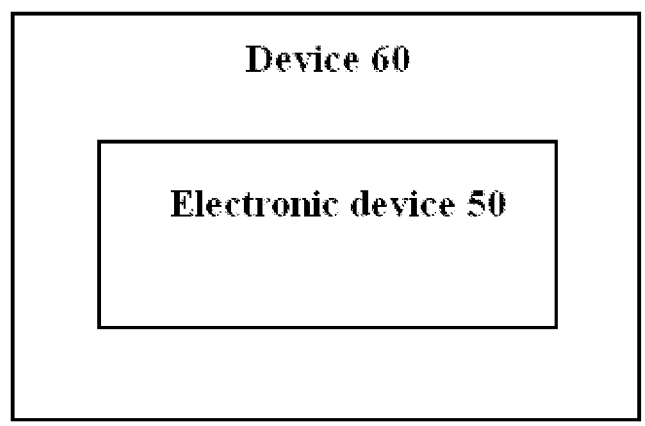
FIG. 9 shows a schematic diagram of a device having a base station function according to an embodiment of the present disclosure.

FIG. 9 shows a device 60 having a base station function of the embodiments of the present disclosure, which includes any one of the abovementioned electronic devices 50 for when an LTE system operates using a supplemental downlink mode in an unlicensed frequency band.

The technical solutions of the present disclosure are described in detail above in conjunction with the drawings. The present disclosure proposes a data transmission solution for when an LTE system operates using a supplemental downlink mode in an unlicensed frequency band, so as to, on the premise that normal operation of the LTE system in the unlicensed frequency band can be ensured, prevent the LTE system from generating significant interference with regard to other systems when operating in the unlicensed frequency band, thereby implementing peaceful coexistence of the LTE system and the other systems in the unlicensed frequency band.

The foregoing is only preferred embodiments of the present disclosure, which are not intended to limit the present disclosure. For those skilled in the art, the present disclosure may have various alterations and variations. Any modifications, equivalent substitutions, improvement and the like made within the spirit and principles of the present disclosure should be included within the scope of protection of the present disclosure.

The invention claimed is:

1. A data transmission method for when an LTE system operates using a supplemental downlink mode in an unlicensed frequency band, applicable to a device having a base station function, comprising:

arranging a channel monitoring sub-frame used for periodically detecting a downlink channel state in a frame structure used only for downlink transmission frequency division duplexing; and within any period, if the channel monitoring sub-frame detects that the downlink channel is in an idle state, sending downlink data via a downlink sub-frame located within the any period in the frame structure, or otherwise, failing to send downlink data within the any period; and the channel monitoring sub-frame is arranged within at least one of downlink sub-frames of the frame structure, and the channel monitoring sub-frame occupies a number of symbols;

wherein, in the operation process of the LTE system, a change rate of channel quality of other systems using the unlicensed frequency band around the LTE system is detected in real time, and the number of symbols occupied by the channel monitoring sub-frame is dynamically set to be directly proportional to the change rate of channel quality of the other systems detected in real time, such that the number of symbols occupied by the channel monitoring sub-frame increases when the change rate of channel quality of the other systems detected in real time increases, and the number of symbols occupied by the channel monitoring sub-frame decreases when the change rate of channel quality of the other systems detected in real time decreases.

2. The data transmission method for when an LTE system operates using a supplemental downlink mode in an unlicensed frequency band according to claim 1, wherein a guard period occupying a predetermined length of time is arranged in each downlink sub-frame of the at least one of the downlink sub-frames, and the channel monitoring sub-frame is arranged behind a symbol occupied by the guard period.

3. The data transmission method for when an LTE system operates using a supplemental downlink mode in an unlicensed frequency band according to claim 2, wherein the predetermined length of time is greater than 0 and is less than or equal to a length of time occupied by 10 symbols, the predetermined number is from 1 to 13, and the sum of the predetermined length of time and the length of time occupied by the channel monitoring sub-frame is less than or equal to 1 ms.

4. The data transmission method for when an LTE system operates using a supplemental downlink mode in an unlicensed frequency band according to claim 3, wherein the symbols occupied by the guard period and the symbols occupied by the channel monitoring sub-frame are located at the front-end or back-end of each of the downlink sub-frames, and other symbols within each of the downlink sub-frames are used for transmitting downlink data.

5. The data transmission method for when an LTE system operates using a supplemental downlink mode in an unlicensed frequency band according to claim 1, further comprising:

in the operation process of the LTE system, detecting a change rate of a load state of the LTE system and a change rate of a load state of other systems using the unlicensed frequency band around the LTE system in real time, and dynamically setting the period of the channel monitoring sub-frame according to at least one selected from the change rate of the load state of the LTE system and the change rate of the load state of the other systems detected in real time.

6. The data transmission method for when the LTE system operates using a supplemental downlink mode in an unlicensed frequency band according to claim 5, wherein, the period of the monitoring sub-frame is:

N×10 ms or M×1 ms, wherein N is a positive integer, and M is a positive integer from 1 to 9.

7. The data transmission method for when an LTE system operates using a supplemental downlink mode in an unlicensed frequency band according to claim 1, further comprising:

judging whether it is necessary to process downlink traffic or not, and if it is necessary to process downlink traffic, then periodically detecting the state of the downlink channel via the channel monitoring sub-frame of the frame structure.

8. The data transmission method for when an LTE system operates using a supplemental downlink mode in an unlicensed frequency band according to claim 1, further comprising:

judging whether the device having a base station function and other devices having a base station function belong to a same operator; and if determining that the device and the other devices belong to a same operator, setting the channel monitoring sub-frame at a same position in the frame structure of the device having a base station function on a same carrier frequency as the position of the channel monitoring sub-frame configured by the other devices in the frame structure of the other devices;

or if determining that the device and the other devices belong to different operators, setting the channel monitoring sub-frame at a different position in the frame structure of the device having a base station function on a same carrier frequency from the position of the channel monitoring sub-frame configured by the other devices in the frame structure of the other devices.

9. An electronic device for when an LTE system operates using a supplemental downlink mode in an unlicensed frequency band, applicable to a device having a base station function, comprising at least one processor; and a memory communicably connected with the at least one processor for storing instructions executable by the at least one processor, and at least one radio frequency module communicably connected with the at least one processor, wherein, execution of the instructions by the at least one processor causes the at least one processor to:

arrange a channel monitoring sub-frame used for periodically monitoring a downlink channel state in a frame structure used only for downlink transmission frequency division duplexing; and within any period, if the channel monitoring sub-frame detects that the downlink channel is in an idle state, send downlink data via a downlink sub-frame located within the any period in the frame structure, or otherwise, fail to send downlink data within the any period; and the first arranging unit is specifically used for arranging the channel monitoring sub-frame to occupy a number of symbols within at least one of downlink sub-frames of the frame structure, wherein, in the operation process of the LTE system, detect a change rate of channel quality of other systems using the unlicensed frequency band around the LTE system in real time; and dynamically set the number of symbols occupied by the channel monitoring sub-frame to be directly proportional to the change rate of channel quality of the other systems detected by the first detecting unit in real time, such that the number of symbols occupied by the channel monitoring sub-frame increases when the change rate of channel quality of the other systems detected in real time increases, and the number of symbols occupied by the channel monitoring sub-frame decreases when the change rate of channel quality of the other systems detected in real time decreases.

10. The electronic device for when an LTE system operates using a supplemental downlink mode in an unlicensed frequency band according to claim 9, wherein the at least one processor is further caused to arrange a guard period occupying a predetermined length of time in each downlink sub-frame of the at least one of the downlink sub-frames, wherein the channel monitoring sub-frame is arranged behind a symbol occupied by the guard period.

11. The electronic device for when an LTE system operates using a supplemental downlink mode in an unlicensed frequency band according to claim 10, wherein the predetermined length of time is greater than 0 and is less than or equal to a length of time occupied by 10 symbols, the predetermined number is from 1 to 13, and the sum of the predetermined length of time and the length of time occupied by the channel monitoring sub-frame is less than or equal to 1 ms.

12. The electronic device for when an LTE system operates using a supplemental downlink mode in an unlicensed frequency band according to claim 11, wherein the symbols occupied by the guard period and the symbols occupied by the channel monitoring sub-frame are located at the front-end or back-end of each of the downlink sub-frames, and other symbols within each of the downlink sub-frames are used for transmitting downlink data.

13. The electronic device for when an LTE system operates using a supplemental downlink mode in an unlicensed frequency band according to claim 9, the at least one processor is further caused to in the operation process of the LTE system, detect a change rate of a load state of the LTE system and a change rate of a load state of other systems using the unlicensed frequency band around the LTE system in real time; and dynamically set the period of the channel monitoring sub-frame according to at least one selected from the change rate of the load state of the LTE system and the change rate of the load state of the other systems detected by the second detecting unit in real time.

14. The electronic device for when the LTE system operates using a supplemental downlink mode in an unlicensed frequency band according to claim 13, wherein, the period of the monitoring sub-frame is:

N×10 ms or M×1 ms, wherein N is a positive integer, and M is a positive integer from 1 to 9.

15. The electronic device for when an LTE system operates using a supplemental downlink mode in an unlicensed frequency band according to claim 9, the at least one processor is further caused to judge whether it is necessary to process downlink traffic or not; and when determining that it is necessary to process the downlink traffic, periodically sense the state of the downlink channel via the channel monitoring sub-frame of the frame structure.

16. The electronic device for when an LTE system operates using a supplemental downlink mode in an unlicensed frequency band according to claim 9, the at least one processor is further caused to judge whether the device having a base station function and other devices having a base station function belong to a same operator; and when the second judging unit determines that the device having a base station function and the other devices belong to a same operator, set the channel monitoring sub-frame at a same position in the frame structure of the device having a base station function on a same carrier frequency as the position of the channel monitoring sub-frame configured by the other devices in the frame structure of the other devices, or when determining that the device having a base station function and the other devices belong to different operators, setting the channel monitoring sub-frame at a different position in the frame structure of the device having a base station function on a same carrier frequency from the position of the channel monitoring sub-frame configured by the other devices in the frame structure of the other devices.

17. A data transmission method for when an LTE system operates using a supplemental downlink mode in an unlicensed frequency band, applicable to a device having a base station function, comprising:

arranging a channel monitoring sub-frame used for periodically detecting a downlink channel state in a frame structure used only for downlink transmission frequency division duplexing; and within any period, if the channel monitoring sub-frame detects that the downlink channel is in an idle state, sending downlink data via a downlink sub-frame located within the any period in the frame structure, or otherwise, failing to send downlink data within the any period; and the channel monitoring sub-frame is arranged within at least one of downlink sub-frames of the frame structure, and the channel monitoring sub-frame occupies a number of symbols;

wherein, in the operation process of the LTE system, a change rate of channel quality of other systems using the unlicensed frequency band around the LTE system is detected in real time, and the number of symbols occupied by the channel monitoring sub-frame is dynamically set to be directly proportional to the change rate of channel quality of the other systems detected in real time, such that the number of symbols occupied by the channel monitoring sub-frame increases when the change rate of channel quality of the other systems detected in real time increases, and the number of symbols occupied by the channel monitoring sub-frame decreases when the change rate of channel quality of the other systems detected in real time decreases; and the number of symbols occupied by the channel monitoring sub-frame is dynamically set to be inversely proportional to a channel detectability of the device having a base station function, such that the number of symbols occupied by the channel monitoring sub-frame increases when the channel detectability of the device decreases, and the number of symbols occupied by the channel monitoring sub-frame decreases when the channel detectability of the device increases.

18. An electronic device for when an LTE system operates using a supplemental downlink mode in an unlicensed frequency band, applicable to a device having a base station function, comprising at least one processor; and a memory communicably connected with the at least one processor for storing instructions executable by the at least one processor, and at least one radio frequency module communicably connected with the at least one processor, wherein, execution of the instructions by the at least one processor causes the at least one processor to:

arrange a channel monitoring sub-frame used for periodically monitoring a downlink channel state in a frame structure used only for downlink transmission frequency division duplexing; and within any period, if the channel monitoring sub-frame detects that the downlink channel is in an idle state, send downlink data via a downlink sub-frame located within the any period in the frame structure, or otherwise, fail to send downlink data within the any period; and the first arranging unit is specifically used for arranging the channel monitoring sub-frame to occupy a number of symbols within at least one of downlink sub-frames of the frame structure, wherein, in the operation process of the LTE system, detect a change rate of channel quality of other systems using the unlicensed frequency band around the LTE system in real time, and dynamically set the number of symbols occupied by the channel monitoring sub-frame to be directly proportional to the change rate of channel quality of the other systems detected in real time, such that the number of symbols occupied by the channel monitoring sub-frame increases when the change rate of channel quality of the other systems detected in real time increases, and the number of symbols occupied by the channel monitoring sub-frame decreases when the change rate of channel quality of the other systems detected in real time decreases; and dynamically set the number of symbols occupied by the channel monitoring sub-frame to be inversely proportional to a channel detectability of the device having a base station function, such that the number of symbols occupied by the channel monitoring sub-frame increases when the channel detectability of the device decreases, and the number of symbols occupied by the channel monitoring sub-frame decreases when the channel detectability of the device increases.

* * * * *